United States Patent [19]
Kosky et al.

[11] 3,764,736
[45] Oct. 9, 1973

[54] REMOTE VISUAL EXAMINATION APPARATUS

[75] Inventors: Richard P. Kosky, East Granby, Conn.; Preston W. Averill, Springfield, Mass.

[73] Assignee: Combustion Engineering, Inc., Windsor, Conn.

[22] Filed: Mar. 3, 1971

[21] Appl. No.: 120,569

[52] U.S. Cl. ............................ 178/7.81, 178/DIG. 1
[51] Int. Cl. ............................................. H04n 5/26
[58] Field of Search ................ 178/DIG. 1, DIG. 38, 178/7.8, 7.81, DIG. 30; 95/86; 352/243; 248/157, 425; 52/115, 116

[56] References Cited
UNITED STATES PATENTS

| | | | |
|---|---|---|---|
| 3,437,748 | 4/1969 | Lataou et al. .................. | 178/DIG. 1 |
| 2,979,832 | 4/1961 | Klemperer ............................. | 95/86 |
| 3,021,834 | 2/1962 | Sheldon ............................... | 178/6.8 |

FOREIGN PATENTS OR APPLICATIONS

| | | | |
|---|---|---|---|
| 782,530 | 9/1957 | Great Britain ....................... | 352/243 |
| 681,747 | 10/1952 | Great Britain .......................... | 95/86 |
| 1,088,226 | 10/1967 | Great Britain ............... | 178/DIG. 30 |

*Primary Examiner*—Robert L. Griffin
*Assistant Examiner*—Joseph A. Orsino, Jr.
*Attorney*—Carlton F. Bryant, Stephen A. Schneeberger, Eldon H. Luther, Robert L. Olson, John F. Carney, Richard H. Berneike and Lawrence R. Kessler

[57] ABSTRACT

A remote visual examination apparatus for viewing reactor internals having a TV camera with a self-contained lighting system and remote focus is extended from a mast which is remotely positionable through particularly placed openings in the reactor core support barrel flange. A pivotal mast vernier elevation and rotation unit rides on the core support barrel flange and serves to control the ultimate elevational and rotational positioning of the mast to orient the TV camera with respect to the particular internal to be viewed. The camera is fixed to the end of the mast by means of a pneumatically actuated tilt assembly which may be remotely controlled to tilt the camera so as to extend the range of view thereof.

10 Claims, 7 Drawing Figures

INVENTORS
R. P. KOSKY
P. W. AVERILL, Jr.

INVENTORS
R. P. KOSKY
P. W. AVERILL, Jr.

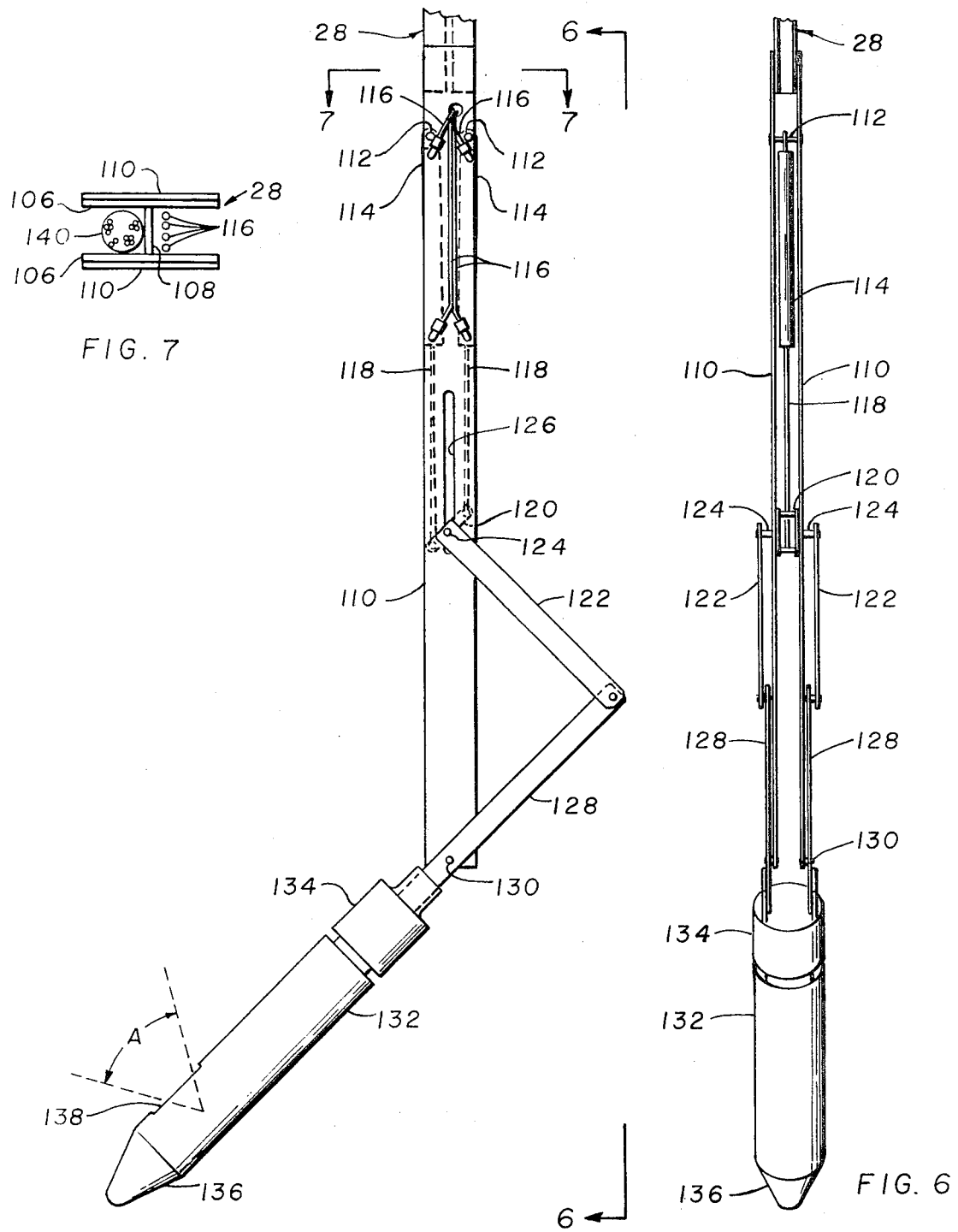

REMOTE VISUAL EXAMINATION APPARATUS

BACKGROUND OF THE INVENTION

Nuclear reactor facilities, which are now being extensively adopted to meet the rapidly growing power requirements in this country, are being subjected to high safety standards because of the public fear of release of dangerous fission products in the event of a major reactor malfunction. In order to comply with the stringent safety standards, reactor facility imspection programs are being developed which include both initial (or base line) inspection of the various reactor components and periodic in-service inspection to determine the continuing structural integrity of the facility at various times in the life thereof. The inspection programs set forth an agenda for both visual and volumetric examination of reactor internals, including for example the pressure vessel, the core stabilizing lug-to-vessel welds, vessel cladding, fuel bundles, thermal shield, and the core support barrel.

The base line inspection is made before the reactor goes into service to ensure safe start-up operation as well as to provide an initial reference point for future testing of each element. The continuing periodic inspection is necessary in that the fundamental components of the reactor facility are subjected to extreme environmental conditions approximating 2,500 psi and 650°F as well as irradiation; these conditions being, of course, highly detrimental to the materials involved.

Even though the periodic inspection is carried out during regular reactor servicing shutdown times, direct visual examination is not possible due to the radiation of the internals. Therefore, inspection apparatus has been developed which is remotely controlled from the reactor refueling machine (application Ser. No. 886,231 filed Dec. 18, 1969 now U.S. Pat. No. 3,664,922, in the name of G. A. Diwinsky et al.). This apparatus is, however, limited in that examination of the pressure vessel requires removal of the reactor internals. If the core support barrel is to remain within the pressure vessel during a particular inspection period, it is not possible to inspect that area between the core support barrel and the pressure vessel with this apparatus due to space limitations.

SUMMARY OF THE INVENTION

There is herein provided an apparatus for remote visual examination of reactor internals and, more particularly, an apparatus for examination of the formerly inaccessible area between the core support barrel and the pressure vessel. A TV camera with a self-contained lighting system and remote focus is extended from a mast which is positionable through particularly placed openings in the reactor core support barrel flange. A pivotable mast vernier elevation and rotation unit rides on the core support barrel flange and serves to control the ultimate elevational and rotational positioning of the mast to orient the TV camera with respect to the particular internal to be viewed. The camera is fixed to the end of the mast by means of a pneumatically actuated tilt assembly which may be remotely controlled to tilt the camera so as to extend the range of view thereof.

BRIEF DESCRIPTION OF THE DRAWINGS

FIG. 5 is a side elevational view of the remote viewing TV camera and the tilt mechanism therefor.

FIG. 6 is a side elevational view of the TV camera and tilt mechanism along the line 6—6 of FIG. 5.

FIG. 7 is a plan view of the remote visual examination mast along the line 7—7 of FIG. 5.

DESCRIPTION OF THE PREFERRED EMBODIMENT

Figure 1:
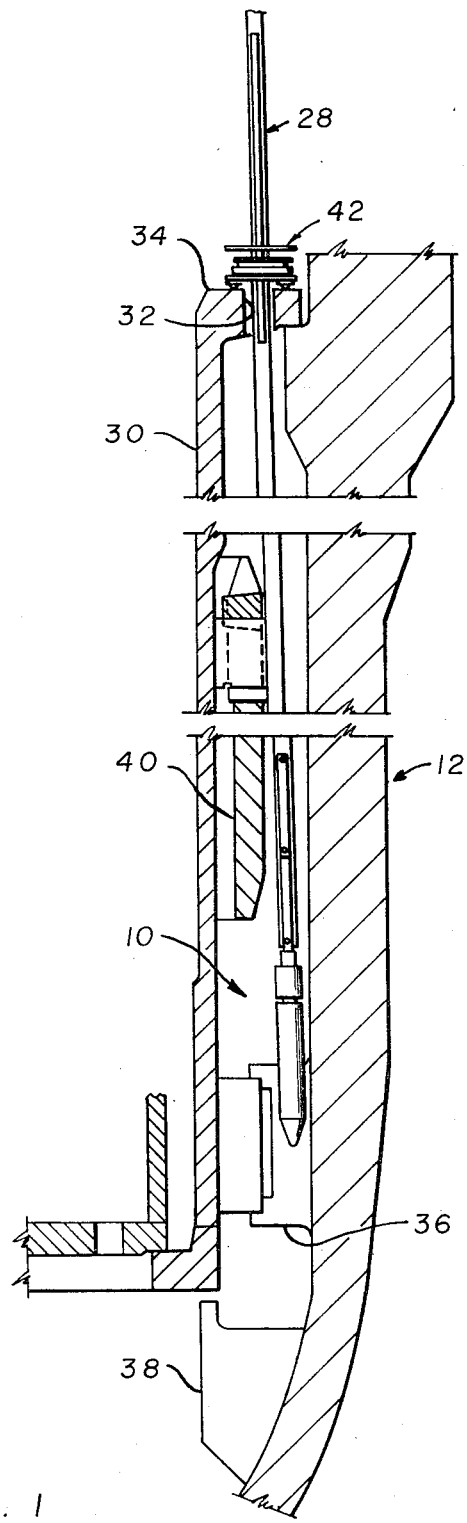
FIG. 1 is a side elevational view of a reactor vessel and associated core support barrel with the remote examination device of this invention positioned therebetween.

Referring now the the drawings, FIG. 1 shows a remote visual examination apparatus 10 for visually examining nuclear reactor internals. The remote visual examination apparatus 10 is used to particularly examine the area between the pressure vessel 12 and the core support barrel 30 located therewithin, but may also be used to inspect beneath the reactor core or the core fuel bundles. The core support barrel 30 has access holes 32 placed at particular strategic points in the core support barrel flange 34, the flange 34 having keys (not shown) to position the core support barrel 30 within the pressure vessel 12. The core support barrel 30 has stabilizing lugs 36 (one shown) located between the pressure vessel 12 and the barrel 30 adjacent the lower portion of the barrel so as to maintain the spacing thereof relative to the housing of the vessel 12. Beneath the core support barrel 30 are core stop lugs 38 (one shown) which position the core relative to the bottom of the pressure vessel 12 in the unlikely event the core should fall. A thermal shield 40 may be located between the core support barrel 30 and the pressure vessel 12 adjacent the reactive core area to provide additional shielding against thermal radiation.

Figure 4:
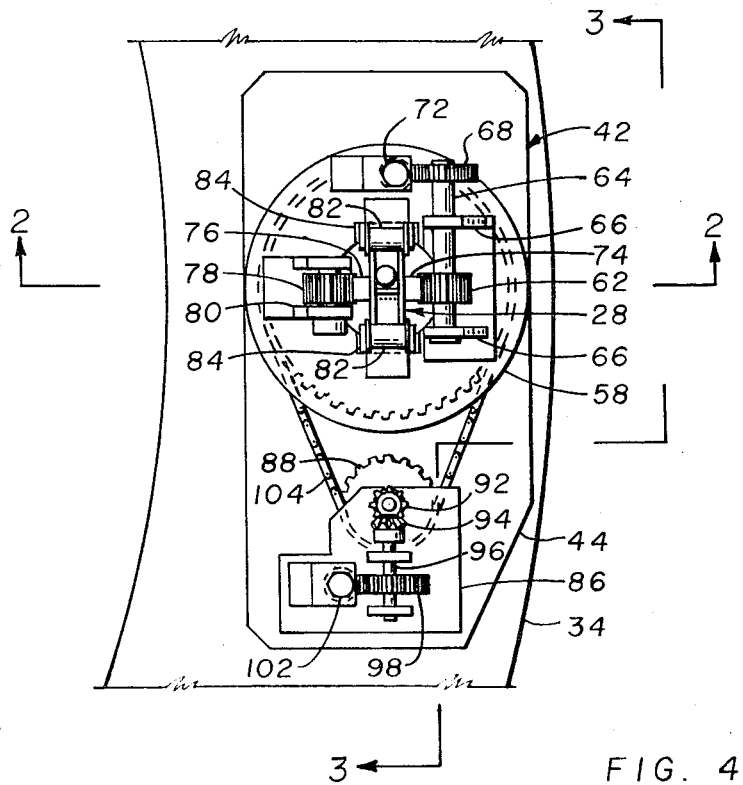
FIG. 4 is a plan view of the pivotable mast vernier elevation and rotation unit according to this invention.
Figure 2:
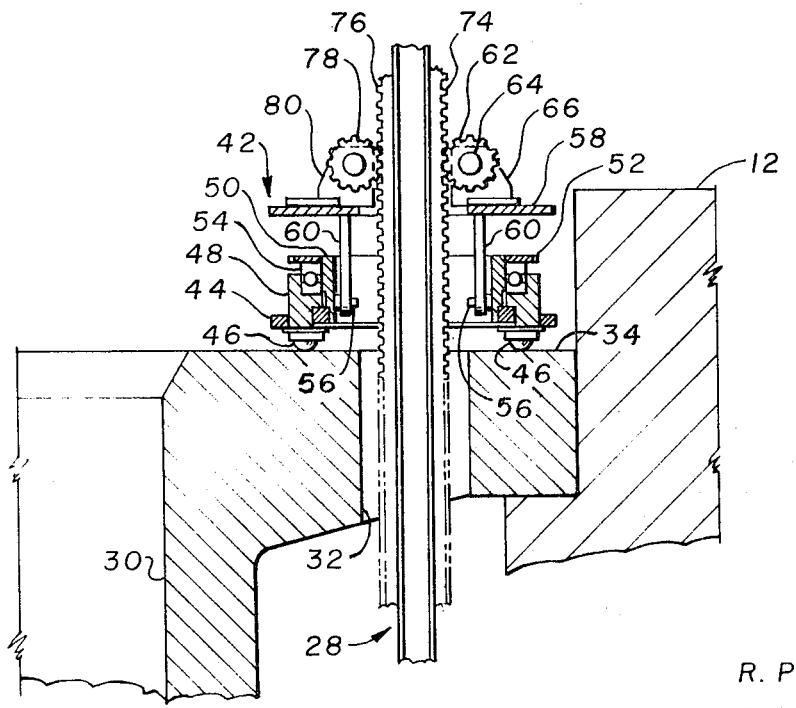
FIG. 2 is a side elevational view of the pivotable vernier elevation and rotation unit along the line 2—2 of FIG. 4.
Figure 3:
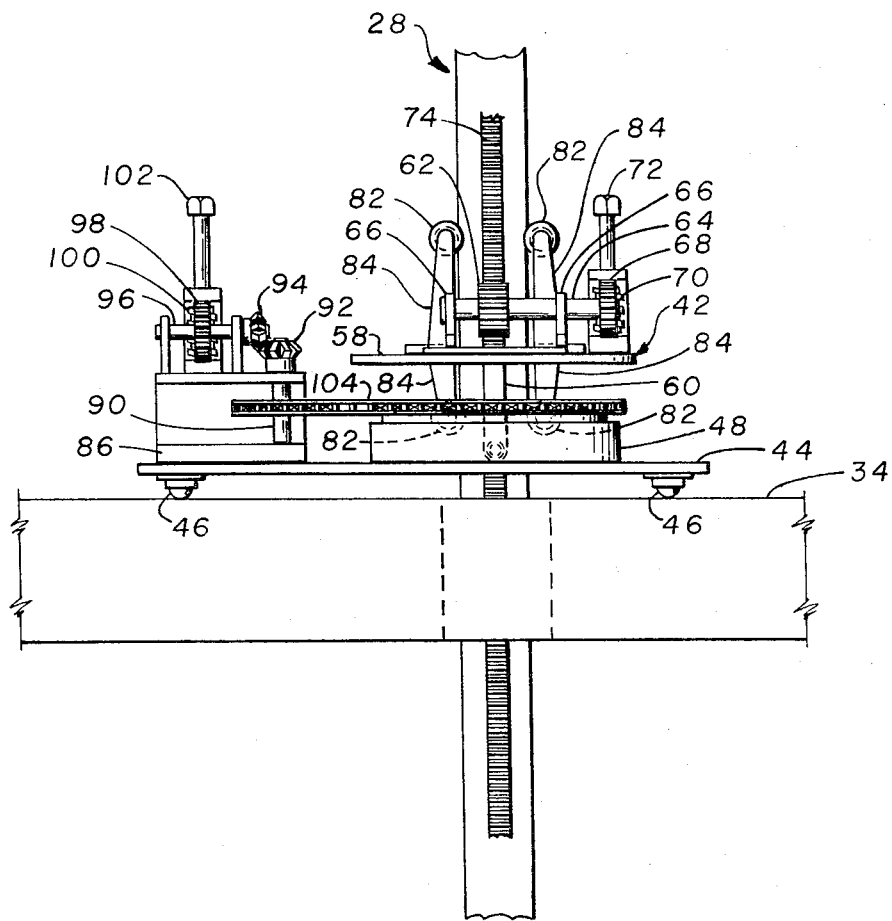
FIG. 3 is a side elevational view of the pivotable mast vernier elevation and rotation unit along the line 3—3 of FIG. 4.

A pivotable mast vernier elevation and rotation unit 42 (see particularly FIGS. 2, 3 and 4) rides on the core support barrel flange 34 overlying the access holes 32. This elevation and rotation unit 42 provides ultimate control actions for a remote visual examination apparatus mast 28 when the mast is inserted in its operating position between the core support barrel 30 and the pressure vessel 12 through the access holes 32. The pivotable mast vernier elevation and rotation unit 42 comprises a base 44 having ball casters 46 fixed to the underside thereof to permit free movement of the unit 42 on the flange 34. The base 44 has a first support 48 for the mounting of a rotating base 50. The rotating base 50 carres a chain sprocket 52 and is mountd in a thrust bearing 54 fixed to the first support 48.

The rotating base 50 carries tilting base bearings 56 to which a tilting base 58 is pivotally joined by means of tilting base legs 60. On the tilting base 58 is a spur gear 62 mounted on a shaft 64, the shaft 64 having the supports 66 therefor fixed to the base 58. At one end of the shaft 64 is a worm gear 68 which meshes with an elevational adjustment actuator gear 70 driven by an elevational adjustment actuator 72.

Fixed to one side of the remote visual examination apparatus mast 28 is a driving rack 74 which is engaged with the spur gear 62 to be driven thereby for selective elevational adjustment of the mast 28. On the opposite side of the mast 28 is a rack 76 which is engaged by a follower gear 78 mounted for rotation on the tilting base 58 by means of a support 80. The follower gear 78 serves to counter the reactive forces of the gear 62 on the mast 28. To provide lateral support for the mast 28 support rollers 82 fixed to the tilting base 58 by means of supports 84 engage opposite edges of the mast 28.

The base 44 of the pivotable mast vernier elevation and rotation unit 42 has additionally mounted thereon a second support 86 upon which a drive sprocket 88 is carried by a shaft 90 rotatably fixed to the support 86. The shaft 90 has a first miter gear 92 fixed to one end thereof engaging a second miter gear 94 mounted on a shaft 96 rotatably carried by the support 86, the shaft 96 also supporting a worm gear 98. The worm gear 98 is engaged by a rotational adjustment actuator gear 100 which, in turn, is actuated by a rotational adjustment actuator 102 for selective rotational adjustment of the mast 28. A sprocket chain 104 is positioned about the drive sprocket 88 and chain sprocket 52 to provide the driving rotational force for the remote visual examination apparatus mast 28.

The remote visual examination apparatus mast 28 is formed in an H configuration (see FIGS. 5, 6 and 7) having broad sides 106 connected by a web 108. The H configuration provides flexibility in one lateral direction to permit flexing on insertion into the cavity of the vessel 12, while providing ridigity in the other lateral direction to allow remote horizontal adjustment to be described hereinbelow. The racks 74 and 76 are fixed to the sides 106 while the lateral support rollers 82 engage the feet of the broad sides 106 to provide motive force and support for the mast 28.

Tilt mechanism housing sides 110 are connected to and extend beyond the end of the mast 28 (in particular see FIG. 6) so as to accommodate the tilt mechanism for the remote visual equipment. Pins 112 extending through the sides 110 support air cylinders 114 having air lines 116 connected to the opposite ends of the cylinders 114 so as to permit the cylinders to be double acting. The airlines 116 extend upward through the H configuration of the mast 28 so that they are readily accessible as well as being protected thereby. Piston rods 118 of the air cylinders 114 are connected to a tilt direction control arm 120 which in turn is connected to actuating arms 122 by pins 124 which extend through slots 126 in sides 110. The actuating arms 122 are connected to pviot arms 128 which, in turn, have a fixed pivot point 130 about the ends of the sides 110. The slots 126 control the extension of the piston rods 118 which, in turn, determine the minimum angle between the actuating arms 122 and the pivot arms 128 to control the position of a TV camera 132. The camera 132 has a bullet nose to facilitate insertion into the cavity of the pressure vessel 12 and help guide it around the thermal shield 40. It is connected to the pivot arms 128 by means of a mounting collar 134. The camera 132 which has a self-contained lighting system and remote focusing may have an opening 138 so as to provide a viewing angle A at right angles thereto or maybe designed for straight ahead viewing. A cable 140 for the camera 132 passes through control arm 120 and between air cylinder 114before extending up through the H portion of the mast 28 on the opposite side of the web 108 from the air lines 116 so as to similarly be protected by the H configuration of the mast 28.

The operation of the remote visual examination apparatus 10 is as follows. The reactor vessel closure head (not shown) is removed and the remote visual examination apparatus mast 28 is manipulated from a remote position above the reactor vault, such as from the refueling machine bridge, so that the remote visual examination apparatus 10 is adjacent a desired access hole 32 in the flange 34 of the core support barrel 30. The pivotable mast vernier elevation and rotation unit 42 is attached to the remote visual examination apparatus mast 28, and lowering of the mast 28 through the selected access hole 32 into the cavity of the pressure vessel 12 is initiated. It is noted that the apparatus 10 is designed specifically for use with the fuel (not shown), core support barrel 30 and thermal shield 40 remaining in the vessel but they may be removed if desired.

The mast 28 is lowered to a level at which the driving rack 74 engages the spur gear 62. At this point vertical elevation is controlled by the elevational adjustment actuator 72 which may be manipulated by a remote handling tool (not shown) so as to provide accurate elevational adjustment of the remote visual examination apparatus 10. When the examination apparatus 10 is substantially at its desired elevational level, proper rotational orientation is accomplished through actuation of the rotational adjustment actuator gear 100 by the rotational adjustment actuator 102, the actuator 102 being manipulated by a remote handling tool such as that used to control the elevational control actuator 72. During the elevational and rotational adjustment, the follower gear 78 and the support rollers 82 serve to stabilize the mast 28. If it is determined that, in addition to the elevational and rotational positioning of the remote visual examination apparatus 10, horizontal movement of the apparatus 10 is necessary to obtain a desired view of a particular reactor internal to be examined, such horizontal movement may be accomplished by horizontal movement of the mast 28 at the remote working level, such as the refueling machine bridge, in the direction opposite to the desired movement. The resultant horizontal movement of the apparatus 10 is possible due to the fact that the tilting base 58 of the pivotable mast vernier elevation and rotation unit 42 pivots about the tilting base bearings 56 so that in effect the mast 28 may be pivoted about an axis through the bearings 56.

After the mast 28 is properly positioned with respect to a particular reactor internal to be examined such as a core stabilizing lug 36, core stop 38, or vessel cladding, the TV camera 132 is turned on so that the viewing angle A thereof is positioned to view the desired internal. Tilting for the purpose of viewing the top or bottom of a particular internal is accomplished by actuation of the air cylinders 114 by selective admission of air through lines 116 to the cylinders 114. By adjusting the lengths of the piston rods 118, the directional control arm 120 will be tilted to the right or left so as to alter the angle between the actuating arm 122 and the pivoting arm 128 to pivot the camera 132 about point 130 for proper camera orientation. With the camera 132 properly positioned, viewing may be undertaken with any necessary adjustments in the angular position of the camera or its elevational or rotational position to increase the viewing range thereof being readily accomplished from the remote position above the reactor vault. For example, if it is desired to view the weld of the core stabilizing lug 36 to the pressure vessel 12 along its entire length, the elevation of the camera 132 may be continually adjusted while the examination process is continuing. In a similar manner the other internals may be examined, the remote visual examination apparatus 10 being moved in turn to desired successive access holes 32 around the core support barrel flange 34.

From the foregoing it is apparent that there is herein provided a remote visual examination apparatus 10 for remote visual examination of reactor internals, while the internals remain within vessel 12, both before and after exposure to radiation. The operation is completely remote and capable of being used in extremely small spaces at distances and geometries which preclude the use of conventional optical systems such as borescopes, perioscopes, and fiberoptics. The pivotable mast vernier elevation and rotation unit 42 affords precise positioning and control for extended viewing by pneumatically tiltable right angle head TV camera 132 having a self-contained light source. Additionally, the H configuration of the remote visual examination mast 28 affords flexibility of the mast in one plane and rigidity in the other so as to provide protection for air lines 116 (used in controlling the tilting of the TV camera 132) and the TV cable 140 while permitting horizontal movement of the mast about a pivot axis just above the core support barrel flange 34.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. A remote visual examination apparatus for viewing nuclear reactor internals comprising:
    a longitudinally extending mast manipulatable from one end;
    a remotely operable optical viewing system;
    means adjustably mounting said optical viewing system on said mast at the end opposite the manipulated end; and
    a remotely operable pivotable mast vernier elevation and rotation unit positionable within the reactor, said pivotable mast vernier unit engagable with said mast for independently adjusting the axial position of said mast along and the rotational positioning of said mast about its longitudinal axis, and said vernier unit further including means permitting pivotable movement of said mast relative to said pivotable mast vernier unit so that said end of said mast opposite said manipulatable end moves in a direction generally perpendicular to the direction of said longitudinal axis.

2. The apparatus of claim 1 wherein said longitudinally extending mast is of an H configuration having broad sides interconnected by a web so as to provide structural rigidity in a first lateral direction and structural flexibility in a second lateral direction.

3. The apparatus of claim 2 wherein said remotely operable optical viewing system includes a TV camera having a self-contained light system and remote focus, the nose of said TV camera being of a bullet shape to facilitate the insertion thereof within the reactor cavity.

4. The apparatus of claim 3 wherein said TV camera is provided with a side opening to provide right angle viewing.

5. The apparatus of claim 2 wherein said means for adjustably mounting said optical viewing system includes an extension means fixed to the end of said mast, pneumatic cylinder means positioned within said extension means, a pivoted linkage system connected at one end to said pneumatic cylinder means and at said opposite end to said optical viewing system whereby actuation of said pneumatic cylinder means will control the viewing angle of said optical viewing system.

6. The apparatus of claim 5 wherein said extension means includes spaced elongated side plates, one plate fixed to each broad side of said mast, said side plates having slots along a portion of the length thereof; and wherein said pivoted linkage system includes a tilt directional control arm having pins extending laterally therefrom, said pins riding in said side plate slots, actuating arm means fixed to said directional control arm for movement therewith, and pivoting arm means fixed at one end to said optical viewing system and pivotably connected at the opposite end to said actuating arm means, said pivoting arm means pivotably connected at an intermediate point to said side plates.

7. The apparatus of claim 2 wherein said remotely operable pivotable mast vernier elevation and rotation unit includes a base, ball casters fixed to the underside of said base to permit lateral adjustment of said unit, the rotational base supported by said first mentioned base, means for selectively rotating said rotational base, and means for selectively adjusting the axial positioning of said longitudinally extending mast, and wherein said means permitting pivotable movement of said mast relative to said pivotable mast vernier unit comprises pivot support bearings fixed to said rotational base and a tilting base supported on said pivot support bearings.

8. The apparatus of claim 7 wherein said means for rotating said rotating base includes a remotely operable actuating gear, a gear assembly actuated by said actuating gear, a drive sprocket rotated by said gear assembly, a chain sprocket fixed to said rotating base, and a chain interconnecting said drive sprocket and said chain sprocket.

9. The apparatus of claim 7 wherein said means for selectively adjusting the axial positioning of said longitudinally extending mast is mounted on said tilting base and includes a remotely operable actuating gear, a gear assembly actuated by said actuating gear and having a spur gear as the final element thereof, and a rack fixed to said longitudinally extending mast, said rack being engaged by said spur gear.

10. The apparatus of claim 9 wherein said remotely operable pivotable mast vernier elevation and rotation unit also includes means mounted on said tilting base for laterally supporting said longitudinally extending mast.

* * * * *

Disclaimer

3,764,736.—*Richard P. Kosky*, East Granby, Conn., and *Preston W. Averill, Jr.*, Springfield, Mass. REMOTE VISUAL EXAMINATION APPARATUS. Patent dated Oct. 9, 1973. Disclaimer filed Aug. 30, 1974, by the assignee, *Combustion Engineering, Inc.*

Hereby enters this disclaimer to claim 1 of said patent.

[*Official Gazette November 12, 1974.*]